United States Patent [19]

Frederick

[11] Patent Number: 4,595,298
[45] Date of Patent: Jun. 17, 1986

[54] TEMPERATURE DETECTION SYSTEM FOR USE ON FILM COOLED TURBINE AIRFOILS

[75] Inventor: Robert Frederick, Cincinnati, Ohio

[73] Assignee: The United States of America as represented by the Secretary of the Air Force, Washington, D.C.

[21] Appl. No.: 729,388

[22] Filed: May 1, 1985

[51] Int. Cl.⁴ .............................................. G01K 1/08
[52] U.S. Cl. .................................... 374/144; 374/145; 415/118; 416/61; 416/97 R
[58] Field of Search ............... 374/144, 145, 147, 148, 374/153, 154, 165, 137, 138, 135; 415/118, 115; 416/61, 97 R, 97

[56] References Cited

U.S. PATENT DOCUMENTS

| | | | |
|---|---|---|---|
| 3,212,336 | 10/1965 | Smith | 73/362 |
| 3,348,414 | 10/1967 | Waters et al. | 374/144 |
| 3,592,061 | 7/1971 | Schwedland et al. | 73/343 R |
| 3,597,974 | 8/1971 | Black | 374/153 |
| 4,029,472 | 6/1977 | Micheli et al. | 374/144 |
| 4,132,114 | 1/1979 | Shah et al. | 374/144 |
| 4,244,222 | 1/1981 | Hoyer et al. | 374/144 |
| 4,279,153 | 7/1981 | Kervistin et al. | 374/144 |
| 4,311,433 | 1/1982 | Bratton et al. | 416/97 A |

Primary Examiner—Charles Frankfort
Assistant Examiner—David R. Schuster
Attorney, Agent, or Firm—Donald J. Singer; Richard J. Donahue

[57] ABSTRACT

Improved temperature detection system for use on film cooled turbine airfoils having a showerhead assembly with a series of parallel slots defined in the leading edge of an airfoil, each slot having a multiplicity of film flow ports exiting therefrom. A plurality of sensor assemblies are affixed to the airfoil showerhead and are couplable via electrodes to electronic sensing equipment for establishing the gas flow temperature.

4 Claims, 2 Drawing Figures

TEMPERATURE DETECTION SYSTEM FOR USE ON FILM COOLED TURBINE AIRFOILS

STATEMENT OF GOVERNMENT INTEREST

The invention described herein may be manufactured and used by or for the Government for governmental purposes without the payment of any royalty thereon.

BACKGROUND OF THE INVENTION

The present invention relates to film cooled turbine airfoils, and more particularly, to an improved temperature dectection system for use on film cooled turbine airfoils.

It is well known that the power output of a gas turbine engine may be increased by increasing the operating temperature of the turbine. This is particularly true in the case of turboshaft or turboprop engines where very small changes in the operating temperature can substantially affect the output. For example, it has been found in a typical engine of this type that a single degree Fahrenheit change in the temperature of the gases driving the power turbine can change the engine power output by as much as seven or eight horsepower. The maximum allowable operating temperature of the turbine, and consequently the maximum level of power output, is limited by the high temperature capabilities of the various turbine elements, particularly the airfoil shaped vanes and buckets upon which the high temperature combustion gases impinge. Therefore, to attain high output from a relatively light weight and compact powerplant, it is desirable to operate the turbine at temperatures as close to the maximum allowable temperature as practicable. In order to accomplish this without exceeding the high temperature capabilities of the turbine elements, the actual gas temperature must be determined in some manner and used as a limiting control parameter. It is conventional to measure the temperature of the gases in either the exhaust section of a turbojet engine or between the gas generator turbine and power turbine sections of turboprop and turboshaft engines. The measured temperature is then used as an indicator of the higher temperatures actually existing in the upstream gas generator turbine and combustor sections of the engine.

It will be appreciated by those skilled in the art that certain measurement errors are inherent in the type of temperature measuring apparatus just described. For example, the average temperature of the total annular stream of combustion gases at a particular axial location in the engine may differ substantially from the local temperatures existing at selected circumferentially and radially spaced points having the same axial location. In other words, the temperature distribution of the stream of combustion products is not uniform.

It is the average temperature, not the local temperatures, that is the significant control parameter for rotating parts such as turbine blades. The locations selected for the gas temperature sensors, typically thermocouples, can thus have a significant effect on the temperature measured and used as an indication of the actual temperature. If the variation between the temperature measured and the actual temperature is large, some engines will run relatively cool, and thereby lack performance, while other engines will run hot, and thereby have reduced engine life. It is therefore desirable, particularly in turboshaft and turboprop engines where there are experienced critical changes in output with changes in temperature, to keep the variation between indicated and actual temperatures as small as possible. One way to increase the accuracy is to increase the number of thermocouples, thereby reducing the circumferential and/or radial spacing therebetween. This approach has limitations in that the additional thermocouples increase the blockage in the coolant fluid flow passageway and therefore increase substantially the pressure drop occurring between the coolant supply at the compressor and the cooled airfoil.

Prior art gas turbine engines have employed numerous instrumentation probes independently mounted on an engine casing and extending into the engine gas flow at various axial engine locations having relatively unobstructed gas flow, such as structural frame elements. For example, in one family of fan jet engines, the exhaust gas temperatures and pressures are sensed by probes located in a structural frame which couples the high pressure turbine to the low pressure turbine.

Although the prior art approach has had generally satisfactory results, the independently mounted probes tend to produce aerodynamic separation and wakes in the gas stream which decrease the overall efficiency of the engine. In addition, in the development of some modern gas tubine engines, efficiency improvement programs have resulted in the elimination of unnecessary weight, including some of the structural frames upon which the prior art instrumentation was mounted.

Furthermore, it is also highly desirable to mount such probes in the gas-contacting blade (either stator or rotor). In fact, it is highly desirable to have a gas turbine blade with a reliable long-life sensor mounted in the leading edge of the airfoil portion of the blade, and having a working or sensing surface at the surface of the leading edge of the airfoil. It should be noted that when sensing surface temperatures in gas turbine engines, it is necessary that the sensor form an integral part of the blade and that the working surface of the sensor be of substantially the same contour and integral with the airfoil surface. This is so because in oxidation and erosion environments as occur in gas turbine engines, even a slight discontinuity between the surface can cause crack initiation and catastrophic failure of the blade.

It is therefore an object of the present invention to enable precision detection in gas turbine engines of temperature variations in gas flow across the leading edge of an airfoil.

It is a further object of the present invention to provide a low profile temperature sensor for use on the leading edge of a gas turbine airfoil.

It is a still further object of the present invention to provide a low profile detector for use in monitoring a property of a gas at the leading edge of a gas turbine airfoil.

SUMMARY OF THE INVENTION

The present improved temperature detection system for use on film cooled turbine airfoils comprises, a showerhead assembly having a series of parallel slots defined in the leading edge of an airfoil, each slot having a multiplicity of film flow ports exiting therefrom. A plurality of sensor assemblies are affixed to the airfoil showerhead and are couplable via electrodes to electronic sensing equipment. The sensor assemblies provide signals which bear a relationship to gas flow temperature.

BRIEF DESCRIPTION OF THE DRAWINGS

The invention will be more clearly understood by reference to the following detailed description of a preferred embodiment thereof in conjunction with the accompanying drawings, in which.

DETAILED DESCRIPTION OF THE DRAWINGS

Figure 1:
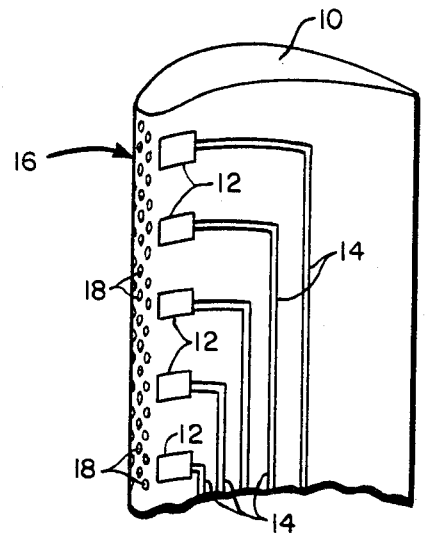
FIG. 1 is a perspective view of an exemplary segment of an airfoil having, prior art sensor configuration.

FIG. 1 is a perspective view of an exemplary segment of prior art airfoil having thermocouple elements 12 affixed to the upstream concave face of airfoil 10. Leads 14 are shown by means of which the elements 12 are coupled to appropriate detection analyzing devices. The elements 12 will be understood to be comprised of conventional temperature sensitive thermocouple material as is known to those of ordinary skill in the art, and two leads 14 will be required for each element 12.

The leading edge 16 of airfoil 10 is shown comprising a showerhead having a multiplicity of cooling film air discharge ports 18. In a known embodiment, the engine compressor, upstream from the combustor, acts on its discharge cycle as a source of cooling air. This cooling air is conveyed to the leading edge 16 through the airfoil body to ports 18. The cooling air is discharged at ports 18 as a thin film thus to cool the airfoil, and is discharged at a rate determined in part by the temperature detected by thermocouple elements 12.

As will become apparent by reference to FIG. 1, the thermocouple sensors 12 are not capable of detecting the temperature of the gas flow directly at the leading edge 16 thereof, but only the diluted gas temperature at the portion of the airfoil to which the sensors 12 are in fact affixed.

Figure 2:
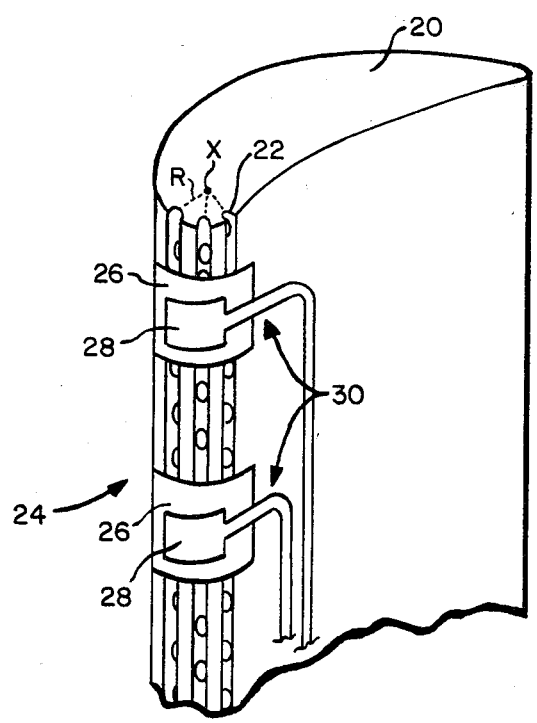
FIG. 2 is a perspective view of a segment of an airfoil in practice of the present invention.

A solution to this problem is provided by the present invention and is illustrated in FIG. 2 of the drawings. As seen in the perspective view of a segment of an airfoil 20 incorporating the present invention, comprises a plurality of parallel slots 22 defined in the showerhead leading edge 24 of airfoil 20. Each slot 22 may be formed by removal of material by cutting, etching, burning or by the ELOX method along an imaginary radius "R" from a center point "X" defined on the side of the airfoil, as shown. Each slot 22 defines one of the rows of air discharge ports 18 which together comprise a showhead means for cooling air delivery. In addition to these slots 22, a plurality of metal plates 26 are affixed over the leading edge 24 in the manner as shown. Preferably, these plates 26 are uniformly spaced one from the other. In a preferred embodiment, high temperature platinum-rhodium plates 26 approximately 10 mils thick are bonded over the leading edge showhead array 24. These plates 26 each are thinly coated appropriately with a sensing material 28 and with electrodes 30 then being coupled thereto.

It will be appreciated that the ELOX-cut slots 22 are sufficiently deep—such as 15 mils—so as to allow a film of air to flow out from under the affixed plates 26. This is important so as to permit continued cooling of the airfoil below plates 26.

In a preferred embodiment, the 10 mil platinum-rhodium plates 26 having a thickness in the order of 10 mils are coated with a dielectric material $AlO_3$. Thereafter, a sensor material 28, such as a temperature sensitive material, is sputtered onto the coated plate. This plate sensor assembly is then affixed to the leading edge showerhead as aforesaid. This sensor material 28 is then coupled to the aircraft analyzing equipment by means of electrodes 30. Also in a preferred embodiment, that area over which the plates 26 are affixed will be etched out a precise amount corresponding to the thickness of the coated plate 26 to be affixed thereat. In this manner, the plates in effect will be countersunk so as to be flush with or at least not to significantly protrude from the airfoil surface. This is particularly important in a rotating airfoil to prevent the plates 26 from being dislodged from the airfoil by centrifugal forces.

If a temperature sensitive material is employed as sensor material 28, it will provide a potential across electrodes 30 directly related detect the temperature of the gas stream at the airfoil. A correction factor can be established to compensate for any changes in the temperature detected by the sensor which are attributable to heat transfer through the metal plate 26 and the $AlO_3$ insulative layer. It will be appreciated, however, that yet other types of sensor material may be employed within the spirit of the invention, provided only that the detected property of the gas and the related change in property of the sensor be equatable to the temperature of the gas.

While the present invention has been described in connection with rather specific embodiments thereof, it will be understood that many modifications and variations will be readily apparent to those of ordinary skill in the art and that this application is intended to cover any adaptation or variation thereof. Therefore, it is manifestly intended that this invention be only limited by the claims and the equivalents thereof.

What is claimed is:

1. Apparatus for measuring the temperature of an annular stream of combustion gases at the leading edge of a film cooled turbine airfoil, comprising:

a film cooled airfoil having a leading edge, said film cooled airfoil having a showerhead assembly defined at said leading edge of said airfoil and including a plurality of parallel slots formed into said leading edge, each of said slots defining a multiplicity of recessed ports in a row, said ports couplable to a cooling air source, and at least one sensor plate assembly, said sensor plate assembly being mounted over a portion of said slots of said showerhead assembly and couplable to electronic temperature indicating equipment via signal conductor means attachable therebetween.

2. The apparatus of claim 1 wherein said sensor comprises a platinum-rhodium plate, having an $AlO_3$ insulative coating applied thereto and a detection film applied to said $AlO_3$ coating.

3. The apparatus of claim 2, wherein at least one plate receiving depression is formed in said leading edge, wherein said sensor plate assembly is mounted in said depression.

4. The apparatus of claim 3, wherein said depression is configured so that the top of sensor plate assembly affixed thereat is flush with the airfoil surface thereat.

* * * * *